April 7, 1942.   I. F. KINNARD   2,278,995
WATTHOUR METER
Filed March 3, 1939   2 Sheets-Sheet 1

Inventor:
Isaac F. Kinnard,
by Harry E. Dunham
His Attorney.

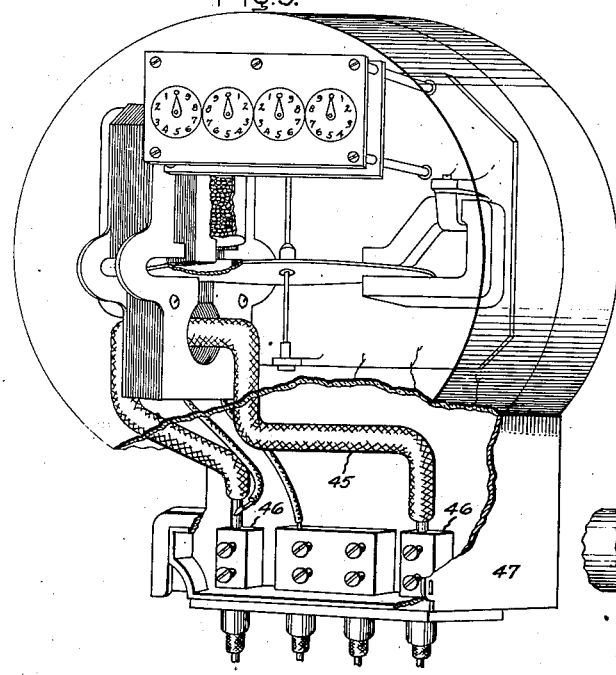
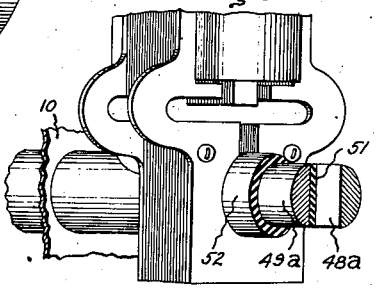
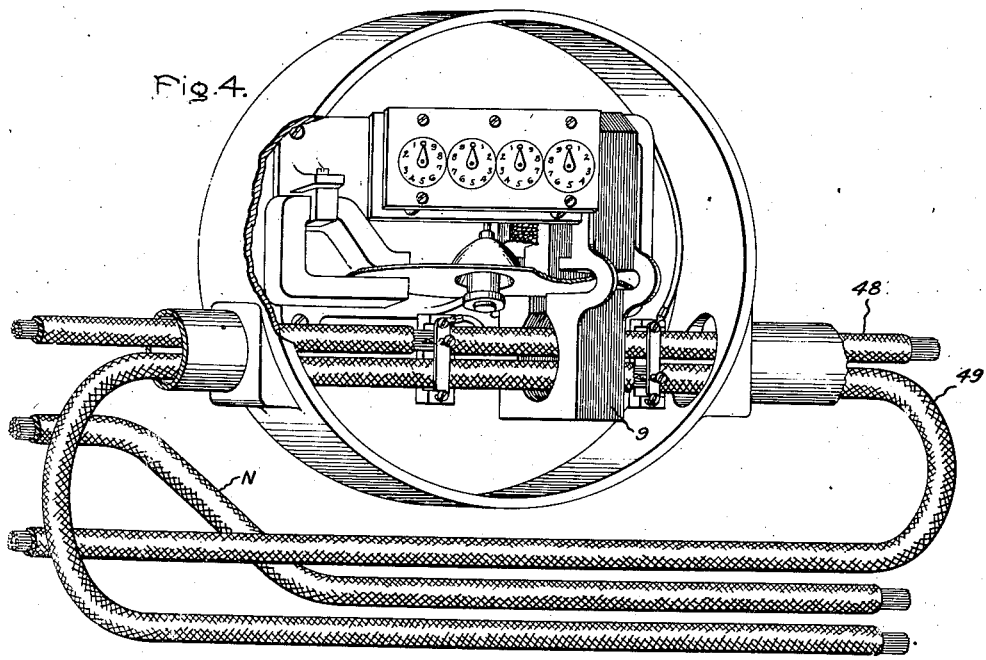

Patented Apr. 7, 1942

2,278,995

UNITED STATES PATENT OFFICE 2,278,995

WATTHOUR METER

Isaac F. Kinnard, Lynnfield, Mass., assignor to General Electric Company, a corporation of New York Application March 3, 1939, Serial No. 259,608

5 Claims. (Cl. 171—34)

My invention relates to induction meters of the watthour meter type including induction wattmeter relays and its object is to reduce the cost of such devices and their installations, and reduce the heating, thus increasing the maximum current rating of self-contained meters, and improve the insulation of the current winding thereof.

In induction watthour meter devices of the prior art, the current winding has invariably consisted of two or more turns in the form of a coil or coils. According to my invention, I dispense with the use of current coils as such and simply pass the current-carrying cable or cables through the legs of the current core and provide a watthour meter structure which may appropriately be given the designation "through type."

In many cases where large currents and large current-carrying cables are concerned, my invention permits of a substantially lower cost meter and meter installation. For example, it enables current transformers to be dispensed with in many cases. One-piece laminations for both current and voltage electromagnets become more feasible. I may advantageously use the cables of the metered circuit as a support for the meter. The heating due to the current winding is reduced, permitting greater overload ratings, the construction permits higher current ratings and the insulation of the current winding is improved. The meter may be shipped from the factory without any current winding, but this does not increase the installation cost. It is also possible to provide means for detaching the meter from the cables and mounting by hinging the current element of the electromagnet.

Figure 1:
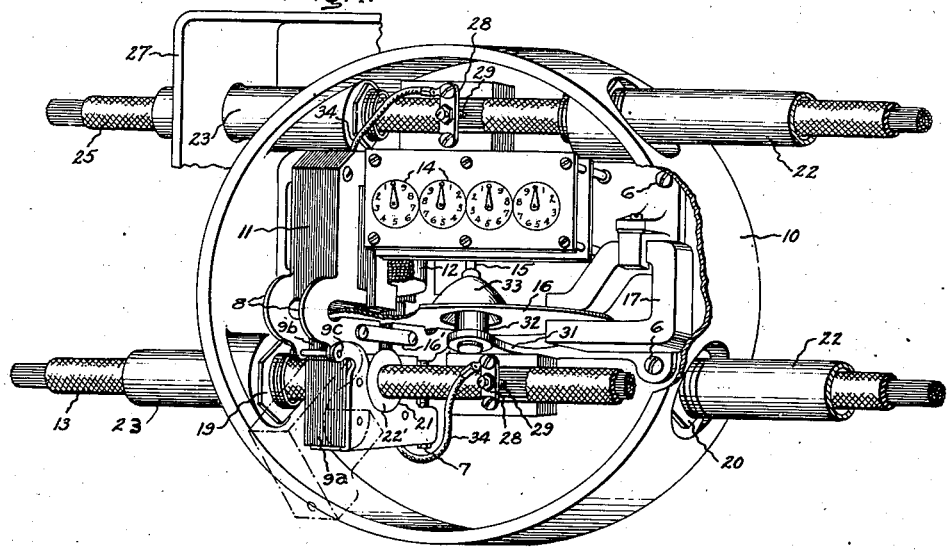
Figure 2:
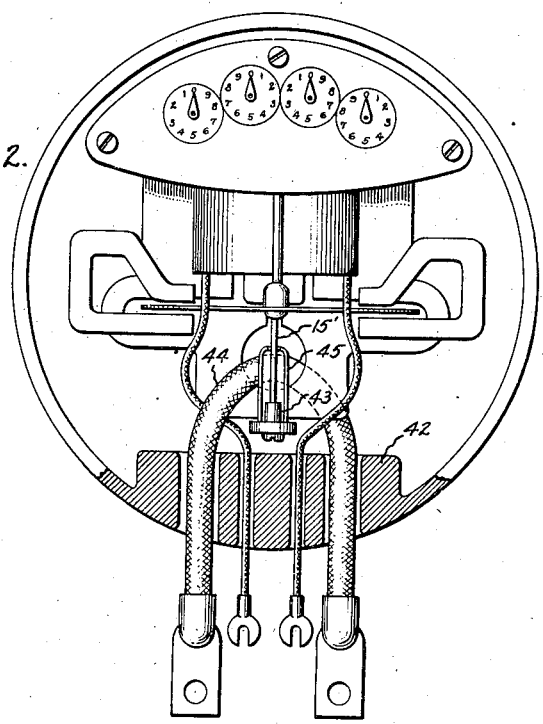

The features of my invention which are believed to be novel and patentable are set forth in the claims appended hereto. For a better understanding of my invention, reference is made in the following description to the accompanying drawings in which Fig. 1 shows a form of my invention in which the current terminals of the meter as such are eliminated and use is made of the cables of the metered circuit for providing the required current flux; Fig. 2 represents the use of an ordinary current jumper cable used as the current winding; Fig. 3 represents a current winding consisting of a U conductor which may also constitute the meter current terminals; Figs. 4 and 5 represent through type current windings for three-wire meter installations.

In Fig. 1 I have shown sufficient of the structure of a single phase watthour meter as is necessary to illustrate the essential features of my invention. 10 represents a meter casing from which the cover has been removed. 11 represents the magnetic laminations for the voltage winding 12 and 9a and 9b represent the magnetic laminations of the current winding which consists of the cable 13. The laminations 11 and 9b are held together by the non-magnetic side plates 8. 14 represents the meter register, 15 the shaft and 16 the induction disk armature of conducting material. The drag magnet is represented at 17. It is believed that the operation of the induction watthour meter is sufficiently well-understood as to make it unnecessary to include a detailed description thereof. The disk armature 16 extends into a gap in the magnetic circuit between the current and voltage electromagnets, and the current and voltage fluxes in such gap operate on the armature to produce an induction torque proportional to the watts of the circuit when the meter is connected as a watthour meter and the drag magnet 17, which is a permanent magnet, produces a flux through the armature which tends to retard its rotation in order that the rotations may be integrated on the register 14 in terms of watthours.

It is noted that the meter has no current terminals as such but one of the cables 13 of the circuit to be metered is simply passed through the bushing holes adjacent nuts 19 and 20 and through the opening at 21 in the U-shaped current core, and passes straight through the meter. To definitely position cable 13 in the current core, I may snugly fit a sleeve 22' between cable 13 and the current core. If desired this sleeve may run completely through the meter and be a part of the sleeves shown at 22 and 23. The meter with the necessary bushing sleeve 22', 22 and 23 and nuts 19 and 20 will simply be strung on cable 13 when the circuit wiring is installed at some convenient point between the source of supply and the load by simply passing the cable 13 through the meter. Hence, no extra wiring or terminals for the current circuit are required. The original insulation on cable 13 need not be disturbed and it thus serves as the requisite insulation for the meter purposes. Preferably the bushings and nuts 19 and 20 secure the meter casing to cable 13 sufficiently to prevent displacement or turning of the meter with respect to the cable 13. If cables 13 and 25 are well secured on both sides of the meter by supports and the cables are of the large size indicated, they may suffice as the entire support for the meter although the meter may be supported in the usual way. The return cable 25 of the metered circuit may pass through the upper part of the meter casing as illustrated. In localities where the meter or its wiring is required to be placed in a box, the meter of the present invention is well-adapted to this end, and at 27 I have indicated one side of a suitable housing and have indicated how the same bushings 22 and 23 may extend through the side walls thereof.

The leads 34 from the voltage coil may be connected to clamps 28, which have a threaded bolt 29 with a sharp end, which, when such clamp is clasped over the insulated cables 13 and 25 inside the meter, may be screwed down to penetrate the insulation and make firm electrical contact with the conductors. In case bushing 22 is made continuous through the meter this voltage connection will require that a hole be drilled through the bushing sufficient to accommodate bolt 29.

As thus arranged, there is no necessity of providing the meter with a terminal chamber as such and hence the expense of this item is eliminated. All necessary electrical connections are made inside of the meter casing directly to the primary circuit conductors and without stripping the insulation therefrom or bending them out of a normal course. The details of the connecting and supporting features may be varied to suit the test and installation requirements of different localities. The opportunity for current theft is reduced.

It is seen that with the form of the invention shown in Fig. 1 the cable 13 passes directly beneath and quite close to the meter armature 16. The lower bearing support 31 is therefore raised from its usual position to make clearance room for cable 13. The bearing support 31 may be made larger than necessary and thus also serve as a guard to prevent cable 13 from being accidentally thrust against the armature 16 when the cable is being installed in a meter without the continuous bushing therethrough. In order to make room for the lower bearing 32, the armature is secured to shaft 16 by a cone-shaped part 33 and the meter bearing 32 extends upward partially within such cone-shaped part and is practically in the plane of the armature 16. This arrangement of the bearing is also advantageous in a meter likely to be subjected to heavy current surges as it contributes to a short shaft and a lower bearing nearly in line with side thrust forces on the armature. With such an arrangement there is little danger of the shaft being bent.

It will be evident that the meter of Fig. 1 will ordinarily be shipped from the meter factory and sold as an article of commerce without any current winding or terminal chamber and hence the cost of these items are eliminated. This, however, does not add to the cost of installation. In fact it should materially decrease the cost of installation, due to the simple requirements above explained.

It will be apparent from the foregoing description that the meter as thus far described is particularly useful in installations where the conductors are quite large and large currents are encountered. In such cases, beneficial results and savings other than those specifically mentioned above are possible by the use of my invention. It is seen that the current winding of the meter is in effect a one-turn winding. It produces a current flux which is only one-half that which would be produced by a winding of two complete turns. In many cases this will eliminate the necessity of installing current transformers which are usually necessary where heavy primary currents are encountered in order to reduce the current through the current winding to a value for existing types of induction watthour meters having two or more complete turns in the current winding. The heating of the meter due to current flow through the current winding is quite materially reduced by means of my invention. To illustrate this point, it may be stated that there has been previously installed meters rated at 50 amperes having in effect one full turn on each leg of the current core. These meters will give satisfactory accuracy on overloads up to about 125 amperes, equivalent to 250 ampere turns in the current winding, but above 125 amperes, the heating of the meter due to current flowing through the current coils and terminals becomes such that the meter is no longer accurate, although if such heating were absent, the meter would measure currents up to 200 amperes, equivalent to 400 ampere turns, with acceptable accuracy. Now, with my invention the length of current circuit within the meter is very materially shortened and the cross-section of the current conductor is, or may be, increased as desired. It generally comprises the service cable itself and hence has no more heating than a corresponding length of the service cable. This very materially reduces the heating of the meter due to current flow in the current winding, and the same 50 ampere meter of the prior art, with no change other than the change to the one-turn current winding of my invention, will measure, with acceptable accuracy, currents up to 400 amperes, equivalent to 400 ampere turns, without undue heating or temperature errors. Preferably the meter should be provided with a saturable magnetic current overload compensating shunt as represented at 16'.

In the 50 ampere meter of the prior art referred to, it was the practice to bend the turns of the current coils to shape and pass them down over the legs of the current core. With my one-turn winding, no bending of the current heavy conductor is necessary to thread it through the current core, and hence it is unnecessary to provide for passing it down through the gap at the open ends of the current core. This aspect of my invention is valuable since it permits of otherwise completing the meter assembly before the current winding is added and makes it feasible to ship the meter to the customer and permit the customer to add the current winding, using the circuit cable itself when the wiring thereto is installed. In cases where the wiring is installed before the meter is available and to facilitate interchange of meters after installation I prefer to make the current core in two parts 9a and 9b as shown in Fig. 1 and to provide a hinge 9c between these parts. The hinged part 9a may be secured in closed position as represented in full lines as by a bolt indicated at 7. Then at any time it is desired to remove the meter from the casing without disturbing current cable 13 the bolt 7 is removed and the core part 9a swung to open position as indicated in dotted lines. Then when the voltage leads are disconnected and the supporting screws such as represented at 6 are removed the meter may be taken out of the casing and replaced by another similar meter in a simple manner without the necessity of disturbing the heavy cables 13 and 25. The air gap effect where the hinged parts of the current core abut together is beneficial from the overload compensation standpoint as explained in United States Patent No. 1,727,509, September 10, 1929, to King et al.

Fig. 2 represents the application of my one-turn current winding to a meter having terminal supporting bushings at 42 and conventional lower bearings 43. In this case the current winding 44 will preferably be made up of a loop of insulated cable having sufficient flexibility as to permit of its being bent into the shape necessary to be placed in the position shown. It passes through the opening in the current core somewhat diagonally and hence does not interfere with the meter shaft below the disk. Such winding will generally be supplied in place with the meter but this is not essential. In any event it is of low cost, is self-insulating and has low self-heating. A guard 45 integral with and rising from the lower bearing support curves part way about the meter shaft, between it and cable 44 to protect the meter shaft 15' from being touched by the cable 44 when it is placed in the meter and later when the meter is in operation.

The meter represented in Fig. 3 is much like that of Fig. 2 except that the current winding 45 is of conductor material bent in a general U shape and providing integral terminals for fastening to the terminals 46 in a conventional terminal chamber 47. The winding 45 may be bent substantially to shape before inserting into the meter in a shape to avoid the meter shaft and lower bearing as represented. It will be evident that this shape of conductor permits it to be threaded through the current core and turned to the position shown without difficulty.

In an induction meter of the single element type for metering a three-wire circuit, it is necessary to provide the current core with two current windings connected in different lines of the metered circuit. My invention may be used in such a meter by running both current circuits through the current core in the manner indicated in Fig. 4. Fig. 4 shows the current core 9 with a central conductor opening therein, as in the previous figures. The two conductors 48 and 49 shown passing through the current core are for connection in the two current measuring cables of a three-wire circuit. The neutral wire is indicated at N. The conductors 48 and 49 should pass through the core in relatively opposite directions and should be so placed with respect to the core design that similar current-flow in each will produce equal metering fluxes.

Fig. 5 shows another way for passing the two conductors 48a and 49a through the current core.

These conductors may have a cross-section in the shape of the sector of a circle and are separated by a strip of insulation 51 placed vertically in the opening, completing the area of a circle. The conductors are further insulated from each other and from the current core by a tube of insulation shown at 52. These parts may have a tight fit so as not to become misplaced, and preferably will run completely through the meter casing, the tube 52 making a dust and moisture-tight fit with the casing where it passes therethrough. The conductors 48a and 49a will have suitable connections with the circuit cables outside the meter. It is evident that the through insulating tube 52 of Fig. 5 might be used with the single phase meter of Fig. 1 for example in which case it would be a simple matter to run the single cable 13 of Fig. 1 therethrough.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. An electric meter device of the induction type comprising a casing, voltage and current electromagnets in said casing, and a rotary armature of conducting material influenced by the joint fluxes of said electromagnets, said current electromagnet having a U-shaped current core, a winding consisting of a straight service cable extending through said casing and the opening in the U-shaped current core, and means for symmetrically locating said cable in the opening in the U-shaped current core.

2. A meter device of the induction type comprising a casing, current and voltage electromagnets in said casing, insulated service cables passing through said casing, said current electromagnet having a U-shaped core through which one of said service cables extends to comprise the current winding of the meter device, a voltage circuit connected between said cables within said casing and a voltage winding for the voltage electromagnet included in said voltage circuit, said meter device having no other terminals or terminal chamber.

3. A meter device of the induction type comprising a casing, current and voltage electromagnets supported in said casing and having pole pieces spaced apart to provide an armature air gap, a rotary armature of conducting material in said gap, said current electromagnet having a U-shaped core, a service cable passing through said casing and between the legs of said U-shaped current core and constituting a single turn winding for said current electromagnet, said current core having a yoke portion which is hinged and which may be opened for the removal and insertion of said cable through the yoke without disturbing said cable.

4. An induction watthour meter part as an article of commerce comprising a casing, a voltage electromagnet, a U-shaped core for a current electromagnet, an armature of conducting material rotatively mounted between said voltage electromagnet and core, said parts being supported in said casing and said casing having cable openings in alignment with the opening between the legs of the U-shaped core for the purpose of the insertion of a serving cable therethrough which when inserted, will form a single turn current winding for said U-shaped core.

5. An electric watthour meter of the induction type comprising a casing, a voltage electro-magnet, a current electro-magnet, a rotary armature of conducting material influenced by the joint action of the flux from said electro-magnets, said current electro-magnet having a U-shaped core and a winding consisting of a single insulated cable extending centrally and only once through the opening in said U-shaped core.

ISAAC F. KINNARD.